(12) United States Patent
Grover

(10) Patent No.: US 9,186,614 B1
(45) Date of Patent: Nov. 17, 2015

(54) APPARATUS FOR HYDROGEN PRODUCTION USING OFF-GASES FROM GTL PROCESSES

(71) Applicant: L'Air Liquide, Société Anonyme pour l'Étude et l'Éxploitation des Procédés Georges Claude, Paris (FR)

(72) Inventor: Bhadra S. Grover, Sugar Land, TX (US)

(73) Assignee: L'Air Liquide Société Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 339 days.

(21) Appl. No.: 13/915,883

(22) Filed: Jun. 12, 2013

Related U.S. Application Data

(60) Provisional application No. 61/658,599, filed on Jun. 12, 2012.

(51) Int. Cl.
*B01D 53/047* (2006.01)

(52) U.S. Cl.
CPC ........... *B01D 53/047* (2013.01); *F25J 2205/40* (2013.01)

(58) Field of Classification Search
CPC .................................................. F25J 2205/40
See application file for complete search history.

(56) References Cited

U.S. PATENT DOCUMENTS

| | | | | | |
|---|---|---|---|---|---|
| 4,750,925 | A | * | 6/1988 | MacLean et al. | 62/624 |
| 5,100,447 | A | * | 3/1992 | Krishnamurthy et al. | 62/630 |
| 7,871,577 | B2 | | 1/2011 | Allam et al. | |
| 2010/0037521 | A1 | * | 2/2010 | Vakil et al. | 48/127.5 |
| 2011/0062012 | A1 | * | 3/2011 | Robinson | 201/2.5 |
| 2012/0275992 | A1 | * | 11/2012 | Jangbarwala | 423/654 |

* cited by examiner

*Primary Examiner* — Imran Akram
(74) *Attorney, Agent, or Firm* — Justin K. Murray

(57) ABSTRACT

An apparatus for producing hydrogen from an off-gas originating from a gas to liquid (GTL) process is provided. The apparatus includes a cryogenic distillation column, a first CO shift reactor, a second CO shift reactor, an SMR, and a first and second PSA. The cryogenic distillation column is configured to receive an off-gas and separate it into a light ends and a heavy ends. The first CO shift reactor is configured to receive the light ends and, in the presence of steam, produce additional hydrogen and carbon monoxide. The SMR is configured to receive the heavy ends and convert hydrocarbons within the heavy ends to hydrogen and CO, with the resulting stream then being treated in the second CO shift reactor to produce additional hydrogen and $CO_2$. The hydrogen is then captured using the first and second PSAs.

7 Claims, 1 Drawing Sheet

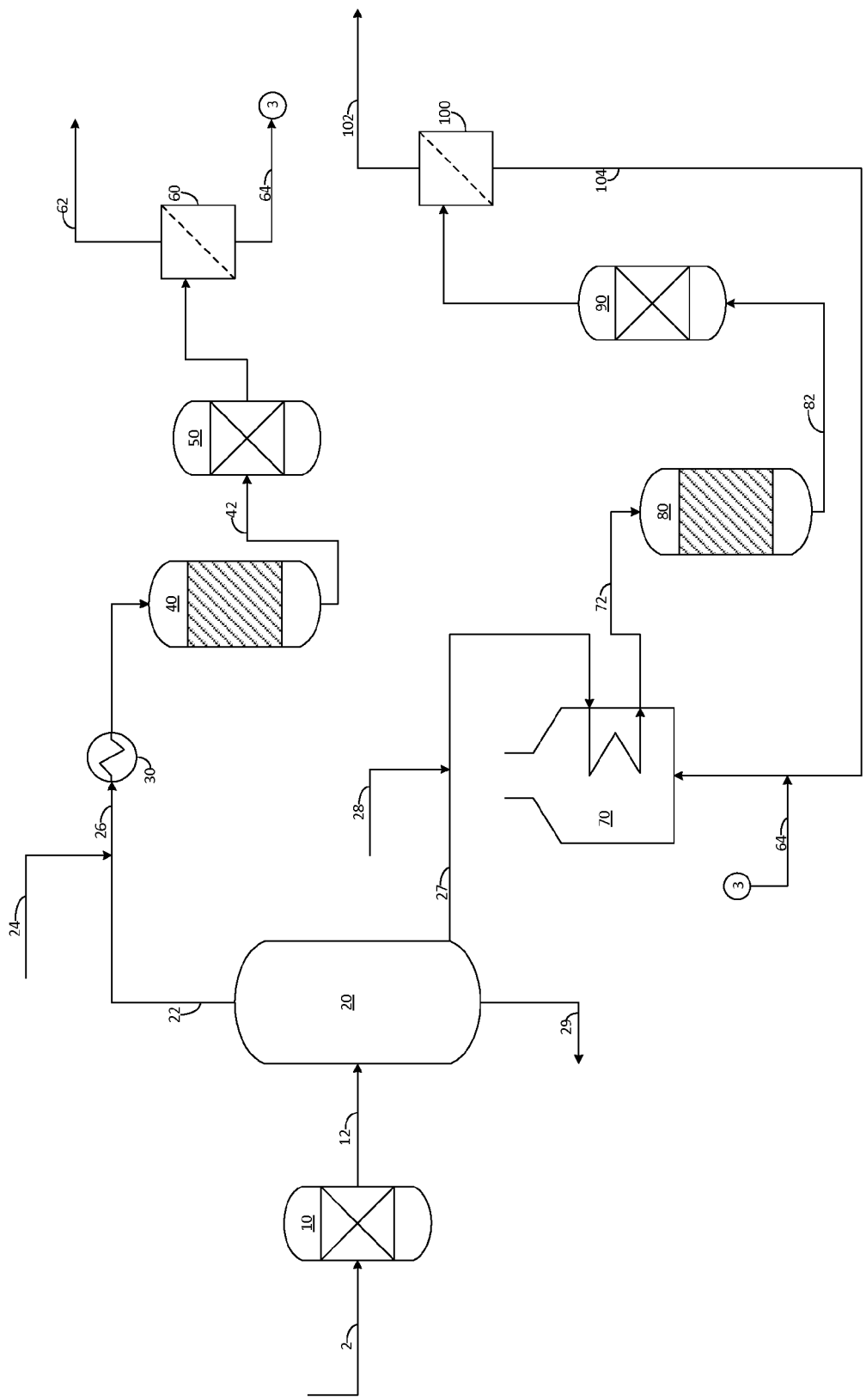

APPARATUS FOR HYDROGEN PRODUCTION USING OFF-GASES FROM GTL PROCESSES

RELATED APPLICATION

This patent application claims priority to U.S. Provisional Patent Application Ser. No. 61/658,599 filed on Jun. 12, 2012, which is hereby incorporated by reference in its entirety.

TECHNICAL FIELD OF INVENTION

The present invention relates to a method for the purification of inert gases. More specifically, the present disclosure relates to a method for the onsite removal of trace impurities, such as nitrogen and methane, from an argon stream using cryogenic distillation separation.

BACKGROUND OF THE INVENTION

Natural gas can be converted to liquid fuels, such as gasoline, for use in transport vehicles. One of the more common methods of converting natural gas to liquid fuels is via syngas generation, which creates a $H_2+CO$ mixture, and then using a Fischer Tropsche (FT) reaction to generate the gasoline. The FT reaction also generates light-end byproducts, such as LPG and olefins, along with some inert molecules that were also in the syngas, such as $N_2$, Ar, and unconverted $CH_4$. These light-end products are also known as off-gases. Typically, these off-gases are burnt, with the heat being utilized for heating other streams, generating steam, and/or to produce power. However, there can be environmental concerns with the combustion of these off-gases.

Previous efforts to reform the off-gas have included steam-reforming or partial-oxidation. However, these efforts have faced serious challenges related to:
- substantial quantities of inert gases such as $N_2$ and Ar, which require larger sizes of equipment and reduce thermal efficiencies of the process;
- presence of a large amount of CO, which greatly increases the potential for metal dusting of various pieces of equipment;
- presence of olefins, which can decompose causing carbon formation and can require an additional hydrogenation step, further adding complexity to the system.

Therefore, it would be beneficial to have a method of using these off-gases for another purpose that may bring higher value while also reducing the impact to the environment.

SUMMARY OF THE INVENTION

The present invention relates to an apparatus that satisfies at least one of these needs. In one embodiment, an apparatus for producing hydrogen using off-gases from a gas to liquid (GTL) process is provided. In one embodiment, the apparatus includes a cryogenic distillation column, a first CO shift reactor, a second CO shift reactor, a steam methane reformer (SMR), and a first and second pressure swing absorber (PSA). The cryogenic distillation column is configured to receive an off-gas and separate it into a light ends and a heavy ends. The first CO shift reactor is configured to receive the light ends and, in the presence of steam, produce additional hydrogen and carbon dioxide. The SMR is configured to receive the heavy ends and convert hydrocarbons within the heavy ends to hydrogen and CO, with the resulting stream then being treated in the second CO shift reactor to produce additional hydrogen and $CO_2$. The hydrogen is then captured using the first and second PSAs In one embodiment, an apparatus for producing hydrogen from an off-gas originating from a gas to liquid (GTL) process is provided. The apparatus includes:
- a cryogenic unit having a cryogenic distillation column, the cryogenic unit configured to receive an off-gas stream originating from a gas to liquid (GTL) process, the off-gas stream comprising hydrogen, nitrogen, argon, carbon monoxide, and hydrocarbons, wherein the cryogenic distillation column is configured to separate the off-gas stream into light ends and heavy ends, the light ends comprising $H_2$, $N_2$, Ar and CO, the heavy ends comprising hydrocarbons, wherein the light ends are produced from a top section of the cryogenic distillation column and the heavy ends are produced from a bottom section of the cryogenic distillation column;
- a first CO shift reactor in fluid communication with the top section of the cryogenic distillation column and a steam source, wherein the first CO shift reactor is configured to produce a first shift stream, wherein the first shift stream comprises an increased amount of $H_2$ and $CO_2$ as compared to the light ends;
- a first pressure swing absorber (PSA) in fluid communication with the first CO shift reactor, wherein the first PSA is configured to produce a first hydrogen product stream and a first tail gas, the first tail gas comprising $CO_2$;
- a steam methane reformer (SMR) in fluid communication with the bottom section of the cryogenic distillation column and a second steam source, wherein the SMR is configured to receive the heavy ends from the bottom section of the cryogenic distillation column and, in the presence of steam, reform the hydrocarbons to produce a reformed stream, wherein the reformed stream comprises an increased amount of $H_2$ and CO as compared to the heavy ends;
- a second CO shift reactor in fluid communication with the SMR, wherein the second CO shift reactor is configured to produce a second shift stream, wherein the second shift stream comprises an increased amount of $H_2$ and $CO_2$ as compared to the reformed stream; and a second pressure swing absorber (PSA) in fluid communication with the second CO shift reactor, wherein the second PSA is configured to produce a second hydrogen product stream and a second tail gas, the second tail gas comprising $CO_2$.

Optional embodiments can also includes any combination of following:
- wherein the first PSA is in fluid communication with burners of the SMR such that the SMR is configured to use the first tail gas as fuel;
- wherein the second PSA is in fluid communication with burners of the SMR such that the SMR is configured to use the second tail gas as fuel;
- wherein the cryogenic unit is configured to remove $N_2$ and Ar from the light ends prior introducing the light ends to the first CO shift reactor;
- wherein the cryogenic unit is configured to remove olefins from the heavy ends withdrawn from the cryogenic distillation column prior to introducing the heavy ends to the SMR; and
- a $CO_2$ removal unit and drier in fluid communication with the cryogenic unit, wherein the $CO_2$ removal unit and drier is configured to dry and remove $CO_2$ from the off-gas stream upstream the cryogenic unit

BRIEF DESCRIPTION OF THE DRAWINGS

These and other features, aspects, and advantages of the present invention will become better understood with regard to the following description, claims, and accompanying drawings. It is to be noted, however, that the drawings illustrate only several embodiments of the invention and are therefore not to be considered limiting of the invention's scope as it can admit to other equally effective embodiments.

FIG. 1 shows one embodiment of the invention.

DETAILED DESCRIPTION

While the invention will be described with several embodiments, it is understood that one of ordinary skill in the relevant art will appreciate that many examples variations, and alterations to the following details are within the scope and spirit of the invention. Accordingly, the exemplary embodiments of the invention described herein are set forth without any loss of generality, and without imposing limitations, relating to the claimed invention.

In one embodiment, the present invention describes an apparatus capable of producing hydrogen using the off-gas from a GTL process. Off-gas from a GTL process typically contains various components, such as hydrogen, nitrogen, argon, carbon monoxide, carbon dioxide, methane, ethane, liquefied petroleum gas (LPG), other light olefins, and the like. A sample composition for off-gas can be found in Table I below:

TABLE I

Composition of Off-gas

| Component | % (Mol) |
|---|---|
| $H_2$ | 10-25 |
| $N_2$/Ar | 2-10 |
| CO | 10-30 |
| $CO_2$ | 15-30 |
| $CH_4$ | 20-35 |
| $C_2H_6$ | 1-3 |
| LPG | 2-4 |
| $C_2, C_3, C_4$ Olefins | 1-3 |

In one embodiment of the invention, the method can include providing an off-gas stream having a composition generally in line with that of Table I as a feed gas. $CO_2$ is removed from the feed gas, and the feed gas is dried before being fed to a cryogenic unit. The cryogenic unit then separates light gases such as $H_2$, $N_2$, Ar and CO from the remaining hydrocarbons. In one alternate embodiment, $N_2$ and Ar can be further separated from $H_2$ and CO, if desired. The heavy hydrocarbons, olefins, and LPG can also be separated from light hydrocarbon, such as methane.

The light gases, which comprise $H_2$ and CO (and some $N_2$ and Ar if not already previously separated) are further processed in a CO shift reactor. Steam is added upstream of the CO shift reactor, and the combined stream is heated to a desired temperature that is effective for conducting a CO shift. The amount of steam required and the temperature at the inlet to the CO shift is well known to those skilled in the art. CO and steam react over a catalyst bed to form $H_2$ and $CO_2$. $CO_2$ formed may be removed if desired, upstream of a PSA, thereby producing a highly pure $H_2$ product and tail gas. In one embodiment, the tail gas can be used as fuel, preferably in a steam methane reformer (SMR).

In another embodiment, the hydrocarbon stream from the cryogenic unit is mixed with steam and sent to an SMR to produce a reformed stream. In an alternate embodiment, the hydrocarbon stream may be pretreated, especially if it contains olefins. The reformed stream is passed through a CO shift reactor, and $CO_2$ removal unit (if desired), before it is sent to a PSA unit producing a highly pure $H_2$ product. In one embodiment, the second PSA tail gas can be used as fuel, preferably in the SMR. Since a substantial amount of the CO has been removed from the hydrocarbons, the hydrogenation of olefins becomes easier. Furthermore, removal of CO also takes away the problem of metal dusting and coking in the SMR.

FIG. 1 provides an illustration of an embodiment of the present invention. Off-gas stream 2 is provided and introduced to $CO_2$ removal unit and drier 10 in order to remove a substantial amount of $CO_2$ and water to produce dry off-gas stream 12. Dry off-gas stream 12 is then introduced to cryogenic unit 20, which is operable to separate light gases from hydrocarbons using a cryogenic distillation column. Light ends 22, which contain $H_2$ and CO (and some $N_2$ and Ar if not already previously separated) are then withdrawn from cryogenic unit 20 and combined with steam 24 to form wet light ends 26. In one embodiment, light ends 22 has at least 90% mole recovery of both hydrogen and CO as compared to dry off-gas stream 12 (e.g., if there were 10 moles of hydrogen and 10 moles of CO in dry off-gas stream 12, then light ends 22 would have at least 9 moles of each). Wet light ends 26 are then heated in heat exchanger 30 to a desired temperature that is effective for conducting a CO shift. The amount of steam required and the temperature at the inlet to the CO shift is well known to those skilled in the art.

Once wet light ends 26 is at the appropriate temperature, it can be then fed into first CO shift reactor 40, where the CO and steam react over a catalyst bed to form $H_2$ and $CO_2$ to produce first shift stream 42. In an optional step, $CO_2$ can be removed in second $CO_2$ removal unit 50 upstream of first PSA 60. First shift stream 42 is then fed to first PSA 60, thereby producing first hydrogen product stream 62 and first tail gas 64. In an optional embodiment, first tail gas 64 can be fed to SMR 70 to be used as fuel for burners within SMR 70.

Hydrocarbons 27 are also withdrawn from cryogenic unit 20 and combined with steam 28 before being introduced into SMR 70. In one embodiment, hydrocarbons 27 has at least 70% mole recovery of methane and 90% mole recovery of olefins as compared to dry off-gas stream 12 (e.g., if there were 10 moles of methane and 10 moles of olefins in dry off-gas stream 12, then hydrocarbons 27 would have at least 7 moles methane and 9 moles of olefins). Within SMR 70, methane within hydrocarbons 27 react with water to produce reformed stream 72, which has increased amounts of $CO_2$ and hydrogen. Reformed stream 72 is then passed through second $CO_2$ shift reactor 80 to form second shift stream 82 before being sent to second PSA 100, to produce second hydrogen product stream 102 and second tail gas 104. In an optional embodiment, $CO_2$ can be removed from second shift stream 82 in third $CO_2$ removal unit 90 upstream of first PSA 60. In an optional embodiment, second tail gas 104 can be fed to SMR 70 to be used as fuel for burners within SMR 70. In an additional embodiment, hydrocarbons heavier than methane can be separated from methane within cryogenic unit 20 and withdrawn as heavy hydrocarbons 29, such that heavy hydrocarbons 29 consists essentially of heavier hydrocarbons, such as ethane, LPG, ethene, propene, butene and the like. In one embodiment, heavy hydrocarbons 29 have substantially more olefins as compared to hydrocarbons 27. In an embodiment not shown, if olefins are present in heavy hydrocarbons 29, this stream can be hydrogenated and then combined with hydrocarbons 27 prior to SMR 70 to increase overall hydrogen recovery.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, language referring to order, such as first and second, should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. An apparatus for producing hydrogen from an off-gas originating from a gas to liquid (GTL) process, the apparatus comprising:
    a cryogenic unit having a cryogenic distillation column, the cryogenic unit configured to receive an off-gas stream originating from a gas to liquid (GTL) process, the off-gas stream comprising hydrogen, nitrogen, argon, carbon monoxide, and hydrocarbons, wherein the cryogenic distillation column is configured to separate the off-gas stream into light ends and heavy ends, the light ends comprising $H_2$, $N_2$, Ar and CO, the heavy ends comprising hydrocarbons, wherein the light ends are produced from a top section of the cryogenic distillation column and the heavy ends are produced from a bottom section of the cryogenic distillation column;
    a first CO shift reactor in fluid communication with the top section of the cryogenic distillation column and a steam source, wherein the first CO shift reactor is configured to produce a first shift stream, wherein the first shift stream comprises an increased amount of $H_2$ and $CO_2$ as compared to the light ends;
    a first pressure swing absorber (PSA) in fluid communication with the first CO shift reactor, wherein the first PSA is configured to produce a first hydrogen product stream and a first tail gas, the first tail gas comprising $CO_2$;
    a steam methane reformer (SMR) in fluid communication with the bottom section of the cryogenic distillation column and a second steam source, wherein the SMR is configured to receive the heavy ends from the bottom section of the cryogenic distillation column and, in the presence of steam, reform the hydrocarbons to produce a reformed stream, wherein the reformed stream comprises an increased amount of $H_2$ and CO as compared to the heavy ends;
    a second CO shift reactor in fluid communication with the SMR, wherein the second CO shift reactor is configured to produce a second shift stream, wherein the second shift stream comprises an increased amount of $H_2$ and $CO_2$ as compared to the reformed stream; and
    a second pressure swing absorber (PSA) in fluid communication with the second CO shift reactor, wherein the second PSA is configured to produce a second hydrogen product stream and a second tail gas, the second tail gas comprising $CO_2$.

2. The apparatus as claimed in claim 1, wherein the first PSA is in fluid communication with burners of the SMR such that the SMR is configured to use the first tail gas as fuel.

3. The apparatus as claimed in claim 1, wherein the second PSA is in fluid communication with burners of the SMR such that the SMR is configured to use the second tail gas as fuel.

4. The apparatus as claimed in claim 1, wherein the cryogenic unit is configured to remove $N_2$ and Ar from the light ends prior introducing the light ends to the first CO shift reactor.

5. The apparatus as claimed in claim 1, wherein the cryogenic unit is configured to remove olefins from the heavy ends withdrawn from the cryogenic distillation column prior to introducing the heavy ends to the SMR.

6. The apparatus as claimed in claim 1, further comprising a $CO_2$ removal unit and drier in fluid communication with the cryogenic unit, wherein the $CO_2$ removal unit and drier is configured to dry and remove $CO_2$ from the off-gas stream upstream the cryogenic unit.

7. An apparatus for producing hydrogen from an off-gas originating from a gas to liquid (GTL) process, the apparatus comprising:
    a cryogenic unit having a cryogenic distillation column, the cryogenic unit configured to receive an off-gas stream originating from a gas to liquid (GTL) process, the off-gas stream comprising hydrogen, nitrogen, argon, carbon monoxide, and hydrocarbons, wherein the cryogenic distillation column is configured to separate the off-gas stream into light ends and heavy ends, the light ends comprising $H_2$, $N_2$, Ar and CO, the heavy ends comprising hydrocarbons, wherein the light ends are produced from a top section of the cryogenic distillation column and the heavy ends are produced from a bottom section of the cryogenic distillation column;
    a first CO shift reactor in fluid communication with the top section of the cryogenic distillation column and a steam source, wherein the first CO shift reactor is configured to produce a first shift stream, wherein the first shift stream comprises an increased amount of $H_2$ and $CO_2$ as compared to the light ends;
    a first pressure swing absorber (PSA) in fluid communication with the first CO shift reactor, wherein the first PSA is configured to produce a first hydrogen product stream and a first tail gas, the first tail gas comprising $CO_2$;
    a steam methane reformer (SMR) in fluid communication with the bottom section of the cryogenic distillation column and a second steam source, wherein the SMR is configured to receive the heavy ends from the bottom section of the cryogenic distillation column and, in the presence of steam, reform the hydrocarbons to produce a reformed stream, wherein the reformed stream comprises an increased amount of $H_2$ and CO as compared to the heavy ends;

a second CO shift reactor in fluid communication with the SMR, wherein the second CO shift reactor is configured to produce a second shift stream, wherein the second shift stream comprises an increased amount of $H_2$ and $CO_2$ as compared to the reformed stream; and a second pressure swing absorber (PSA) in fluid communication with the second CO shift reactor, wherein the second PSA is configured to produce a second hydrogen product stream and a second tail gas, the second tail gas comprising $CO_2$, wherein the first PSA is in fluid communication with burners of the SMR such that the SMR is configured to use the first tail gas as fuel, wherein the second PSA is in fluid communication with burners of the SMR such that the SMR is configured to use the second tail gas as fuel.

* * * * *